(12) United States Patent
Chang et al.

(10) Patent No.: US 8,314,898 B2
(45) Date of Patent: Nov. 20, 2012

(54) DISPLAY DEVICE HAVING HEATING LAYER AND METHOD OF MAKING THE SAME

(75) Inventors: Mao-Yi Chang, Hsin-Chu (TW);
Chia-Tien Peng, Hsin-Chu (TW);
Chih-Wei Chao, Hsin-Chu (TW);
Chien-Sen Weng, Hsin-Chu (TW);
Chao-Shun Liao, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 146 days.

(21) Appl. No.: 13/050,950

(22) Filed: Mar. 18, 2011

(65) Prior Publication Data
US 2011/0164195 A1  Jul. 7, 2011

Related U.S. Application Data

(60) Continuation of application No. 12/748,471, filed on Mar. 29, 2010, now Pat. No. 7,932,987, which is a division of application No. 11/840,219, filed on Aug. 17, 2007, now Pat. No. 7,755,738.

(30) Foreign Application Priority Data

Jun. 20, 2007 (TW) ............................... 96122031 A

(51) Int. Cl.
*G02F 1/137* (2006.01)
(52) U.S. Cl. ......................................... 349/22; 349/162
(58) Field of Classification Search .................... 349/22, 349/139, 161
See application file for complete search history.

(56) References Cited

U.S. PATENT DOCUMENTS

| | | | |
|---|---|---|---|
| 4,643,525 | A | 2/1987 | Haim |
| 4,723,835 | A | 2/1988 | Franklin |
| 5,523,873 | A | 6/1996 | Bradford |
| 6,522,383 | B2 | 2/2003 | Brandt |
| 2004/0224241 | A1 | 11/2004 | Park |
| 2005/0073632 | A1 | 4/2005 | Dunn |
| 2005/0073640 | A1 | 4/2005 | Dunn |
| 2005/0105009 | A1 | 5/2005 | Dunn |

FOREIGN PATENT DOCUMENTS

| | | |
|---|---|---|
| CN | 1519955 A | 8/2004 |
| JP | 55022772 | 2/1980 |
| JP | 64073316 | 3/1989 |
| JP | 05173160 | 7/1993 |
| JP | 5196951 | 8/1993 |
| JP | 06289389 | 10/1994 |
| JP | 10228013 | 8/1998 |
| JP | 2000214476 A | 8/2000 |
| JP | 200335897 | 2/2003 |
| JP | 2006030727 | 2/2006 |
| TW | 221071 | 2/1994 |
| TW | 200405074 | 4/2004 |

(Continued)

*Primary Examiner* — Phu Vu
(74) *Attorney, Agent, or Firm* — Winston Hsu; Scott Margo

(57) ABSTRACT

A display device includes a first substrate, a heating layer formed on the first substrate, an insulating layer having a first opening formed on the heating layer, at least one switching device, two contact pads formed on the insulating layer, and respectively electrically connected to the scan line and the data line, a capacitor, a passivation layer covering the switching device and the capacitor, and a pixel electrode formed on the passivation layer and electrically connected to the drain of the switching device. The source of the switching device is connected to the data line. The passivation layer has a plurality of second openings exposing the contact pads.

21 Claims, 13 Drawing Sheets

FOREIGN PATENT DOCUMENTS

| | | |
|---|---|---|
| TW | 200515048 | 5/2005 |
| TW | 200523612 | 7/2005 |
| TW | 200527041 | 8/2005 |
| TW | 200600887 | 1/2006 |
| TW | 200600896 | 1/2006 |

# DISPLAY DEVICE HAVING HEATING LAYER AND METHOD OF MAKING THE SAME

CROSS REFERENCE TO RELATED APPLICATIONS

This is a continuation application of patent application Ser. No. 12/748,471 filed on Mar. 29, 2010, now allowed, which is a divisional application of patent application Ser. No. 11/840,219 filed on Aug. 17, 2007, now allowed.

BACKGROUND OF THE INVENTION

1. Field of the Invention

The present invention relates to an electro-optical device and the method for making the same, and more particularly, to a display device such as a liquid crystal display (LCD) having a heating layer, and the method for making the same.

2. Description of the Prior Art

Due to the lighter weight and smaller size, LCDs have been applied to various kinds of portable electronic products, global positioning systems (GPS) of modes of transportation, and to outdoor large-sized display devices. However, during actual application, the liquid crystal does not operate normally at lower temperatures, so as to cause usage inconveniences when operating the LCD. When the liquid crystal is at a lower temperature, the liquid crystal has to be illuminated by the backlight for a long time after starting the LCD. And then, the liquid crystal can be operated normally when the temperature has risen to the normal operating temperature. For example, if a car in a colder climate zone is equipped with a GPS or others device having a LCD, the LCD has to wait for an extended period of time after starting the car prior to the normal operating of the LCD; as a result, the safety of driving the car would be thereby affected.

SUMMARY OF THE INVENTION

It is therefore an object of the present invention to provide a display device so as to overcome a limitation in the usage application of the LCD.

According to the present invention, an LCD is further provided. The LCD includes a first substrate, a heating layer formed on the first substrate, an insulating layer formed on the heating layer, and the insulating layer having at least one first opening, at least one switching device formed on the first substrate, at least two contact pads formed on the insulating layer, and respectively electrically connected to the scan line and the data line, at least one capacitor formed on the insulating layer, at least one passivation layer covering the switching device and the capacitor, and at least one pixel electrode formed on the passivation layer and electrically connected to the drain of the switching device. The switching device has a drain, a gate connected to a scan line, and a source connected to a data line. The passivation layer has a plurality of second openings respectively exposing the contact pads.

According to the present invention, an electro-optical device includes the above-mentioned display device is provided.

According to the present invention, a method for making a display device is provided. The method for making a display device includes the following steps. A first substrate is provided, and a heating layer is formed on the first substrate. An insulating layer comprising at least one first opening is formed on the heating layer. At least one switching device is formed on the first substrate, wherein the switching device includes a drain, a gate connected to a scan line, and a source connected to a data line. At least two contact pads electrically connected to the scan line and the data line is formed on the insulating layer, respectively. At least one capacitor is formed on the insulating layer. At least one passivation layer is formed to cover on the switching device and the capacitor, wherein the passivation layer comprises a plurality of second openings exposing parts of the contact pads. At least one pixel electrode is formed on the passivation layer, wherein the pixel electrode is electrically connected to the drain of the switching device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
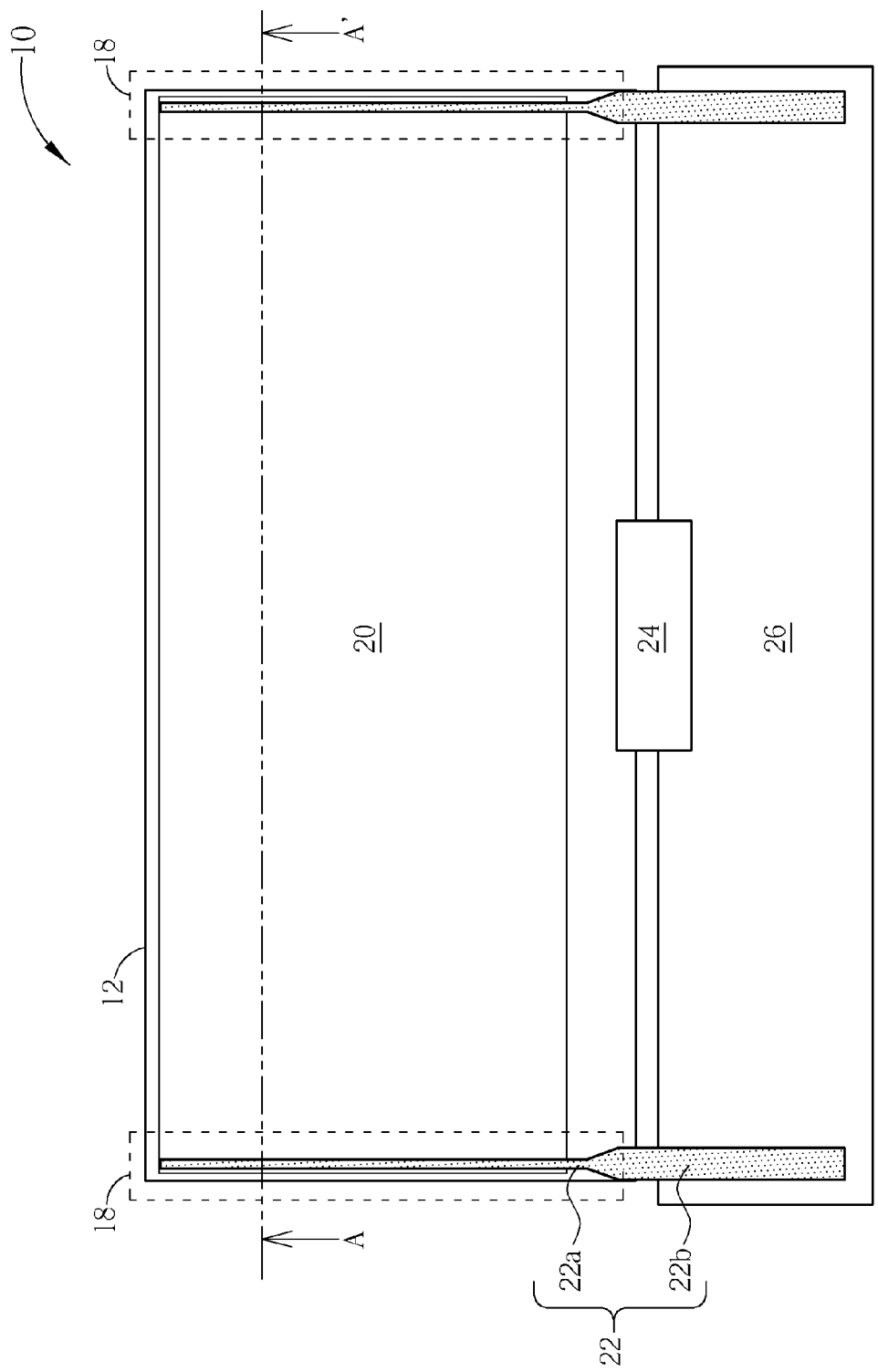
FIG. 1 and FIG. 2 are schematic diagrams illustrating a method of forming an LCD according to an embodiment of the present invention.
Figure 2:
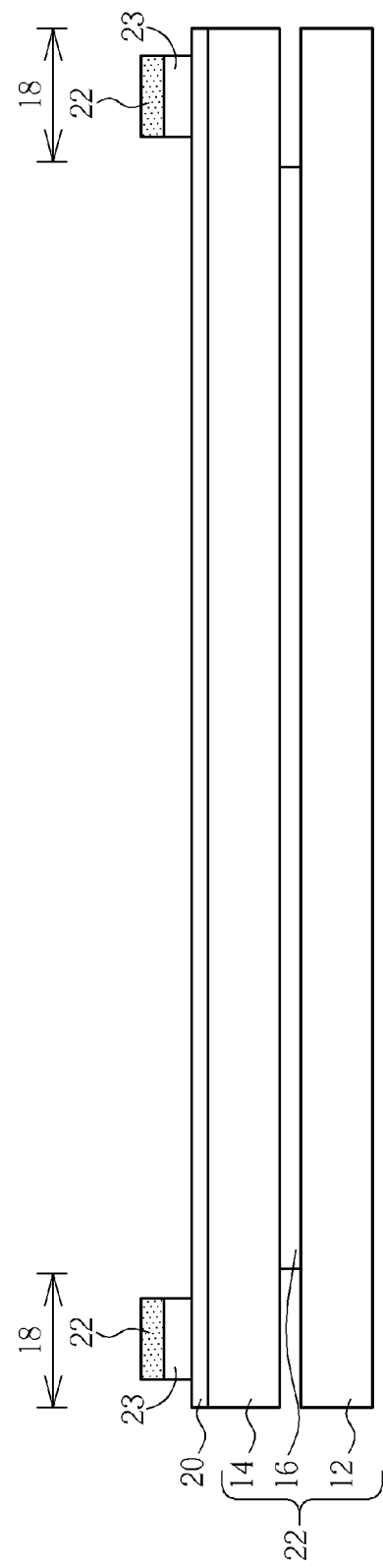

Please refer to FIG. 1 and FIG. 2. FIG. 1 and FIG. 2 are schematic diagrams illustrating a method of forming an LCD according to an embodiment of the present invention. FIG. 1 is a top view of the LCD; and FIG. 2 is a cross-section of the LCD along a cross-section line AA' shown in FIG. 1. As shown in FIG. 1 and FIG. 2, first, an LCD panel 10 is provided. The LCD panel 10 comprises a first substrate 12 having an array layer (not shown in figure), a second substrate 14 having a common electrode (not shown in figure), and a liquid crystal layer 16 disposed between the first substrate 12 and the second substrate 14, and the LCD panel 10 has at least one peripheral region 18. In order to display the full-color picture, the LCD panel 10 comprises a color filter layer (not shown in figure) disposed on one of the first substrate 12 and the second substrate 14. In other words, the color filter layer can be selectively disposed on the second substrate 14, that is between the second substrate 14 and the common electrode or disposed on the first substrate 12, that is one of between the first substrate 12 and the array layer (not shown in figure) and on the array layer. This embodiment takes the first substrate 12 having an array layer thereon, which is also called an array substrate, the second substrate 14 having a color filter layer thereon, which is also called color filter substrate, and a liquid crystal layer 16 disposed between the first substrate 12 and the second substrate 14 as an example, but is not limited to this. A heating layer 20 is formed on an outside surface of the second substrate 14 of the LCD panel 10, and two first flexible printed circuits (FPCs) 22 are respectively fixed on the heating layer 20 in the peripheral region 18 of the LCD panel 10. The present embodiment takes two first FPCs 22 respectively fixed on the heating layer 20 in two peripheral regions 18 which are opposite to each other in the LCD panel 10 as an example, but is not limited to this. The above-mentioned two first FPCs 22 also can be selectively fixed on the heating layer 20 in the peripheral regions 18 adjacent to each other in the LCD panel 10, or on the heating layer 20 in the peripheral regions 18 which are not opposite to each other. In addition, this embodiment is to dispose the two first FPCs 22 on one of the two outside surfaces of the LCD panel 10, but is not limited to this; and this embodiment also can selectively add or reduce the number of the first FPC 22 used according to design requirements. Therefore, the number of the first FPC 22 to be disposed can selectively be one, two, three, four, five, six, etc. In addition, the number of the peripheral region 18 can selectively be one, two, three, four, etc. This embodiment uses two peripheral regions 18 as an example, but is not limited to this.

In this embodiment, in order to prevent negative affect upon the transmittance of the LCD, it is preferred heating layer 20 can be a transparent conductive layer, such as indium-tin oxide, indium-zinc oxide, aluminum-zinc oxide, cadmium-tin oxide, hafnium oxide, other material, or combinations thereof, but is not limited to this. The heating layer 20 also can be an opaque conductive layer, a light-shielding conductive layer, and a reflective conductive layer, such as gold, silver, copper, iron, tin, lead, cadmium, molybdenum, wolfram, titanium, tantalum, aluminum, other materials, an alloy thereof, a nitride thereof, an oxide thereof, or a combination thereof, or a combination of the transparent conductive layer and at least one of the opaque conductive layer, the light-shielding conductive layer, and the reflective conductive layer. In addition, the heating layer 20 of this embodiment takes a single layer material as an example, but the heating layer 20 also can selectively take the multi-layer material as an example, such as for example two layers, three layers, four layers, five layers, etc., according to the design requirements. To allow the first FPCs 22 to be more firmly fixed on the heating layer 20, it is preferred to utilize a connected device 23, such as a conductive binder, solder, conductive tape, non-conductive binder comprising conductive particle, nonconductive binder not comprising conductive particle, nonconductive tape with or without conductive material, to fix the first FPCs 22 on the heating layer 20. A voltage can be transmitted to the heating layer 20 by using the first FPCs 22, so that the heating layer 20 corresponded to the two sides of the LCD panel 10 opposite to each other will generate heat due to a voltage difference. In this embodiment, the conductive tape is acts as the connected device 23, and is disposed between the heating layer 20 and the first FPCs 22 so as to fix the first FPCs 22 on the heating layer 20, but is not limited to this. The connected device 23 also can be disposed on the heating layer 20 and the first FPCs 22, or on a combination of the dispositions thereof base on the material of the connected device 23 used. In addition, the LCD further comprises at least one second FPC 24 disposed on the LCD panel 10 is adapted to transmit the signals required by the LCD panel 10. Besides, in order to simplify the connected point adapted to transmit signals that the LCD panel 10 requires, it is preferred a PCB 26 connects to at least one of the first FPCs 22 and/or the second FPC 24.

Figure 3:
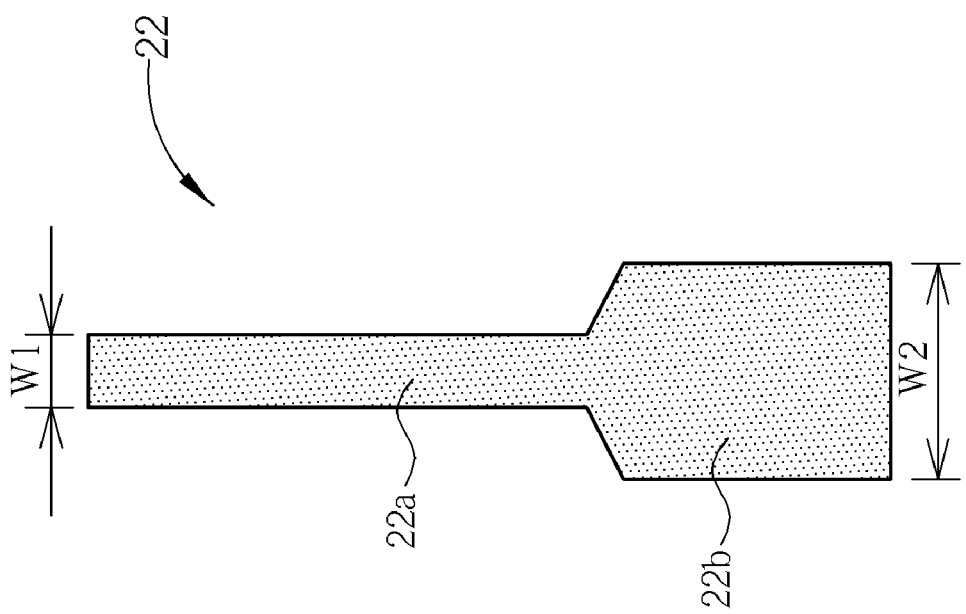
FIG. 3 is an enlarged schematic diagram illustrating the first FPCs of the embodiment.

Please refer to FIG. 3, and also refer to FIG. 1 and FIG. 2 together. FIG. 3 is an enlarged schematic diagram illustrating the first FPCs 22 of this embodiment. As shown in FIG. 3, in this embodiment, two first FPCs 22 both have a plurality of narrow portions 22a and a plurality of wide portions 22b, but are not limited to this; and at least one of the first FPCs 22 of this embodiment has a narrow portion 22a and a wide portion 22b. The narrow portion 22a is connected to the heating layer 20; and a portion of the wide portion 22b is protruded to the outside of the LCD panel 10. The narrow portion 22a of the first FPCs 22 has a first width w1 and the wide portion 22b has a second width w2. The preferred ratio of w1/w2 is range of about 0.1 to about 0.9, but is not limited to this.

The first FPCs 22 of the present invention having a design with different widths is to prevent the size of the first FPCs 22 from being too larger for exceeding the perimeter of the peripheral region 18 of the LCD panel 10 to negatively affect the transmittance of the display region. Thus the first FPCs 22 have a design having the narrow portions 22a. Moreover, the first FPCs 22 have to be bent at the bottom of the LCD panel 10, and this bending can easily lead to damages to the first FPCs 22. Under this condition, the first FPCs 22 are required to have a certain amount of strength. As a result, the first FPCs 22 have a design having the wide portions 22b.

In the above-mentioned embodiment, the first FPCs 22 and the second FPC 24 are connected to the same PCB 26, but the application of the present invention is not limited to this. According to different design requirements, the first FPCs 22 and the second FPC 24 also can be respectively connected to different PCBs, or at least one of the first FPCs 22 and the second FPC 24 is disconnected from the PCB. In addition, the positioning of the heating layer 20 is not limited to be on the outside surface of the second substrate 14. The heating layer 20 also can selectively be disposed on the outside surface of the first substrate 12, on both the outside surface of the first substrate 12 and the outside surface of the second substrate 14 at the same time, on the inside surface of the first substrate 12, on the inside surface of the second substrate 14, on both the inside surface of the first substrate 12 and the inside surface of the second substrate 14 at the same time, on both the inside surface of the first substrate 12 and the outside surface of the second substrate 14 at the same time, on both the outside surface of the first substrate 12 and the inside surface of the second substrate 14 at the same time, or combinations thereof. Further, sometimes for reducing the affect of the rigidness feature of the PCB 26, the PCB 26 also can be refrained from being regarded as a receiving terminal for signal transmission. Thus the second FPC 24 is utilized to be connected to one of the first FPCs 22 to transmit the signals that the LCD panel 10 requires and also to transmit the voltage that the heating layer 20 requires together.

Figure 4:
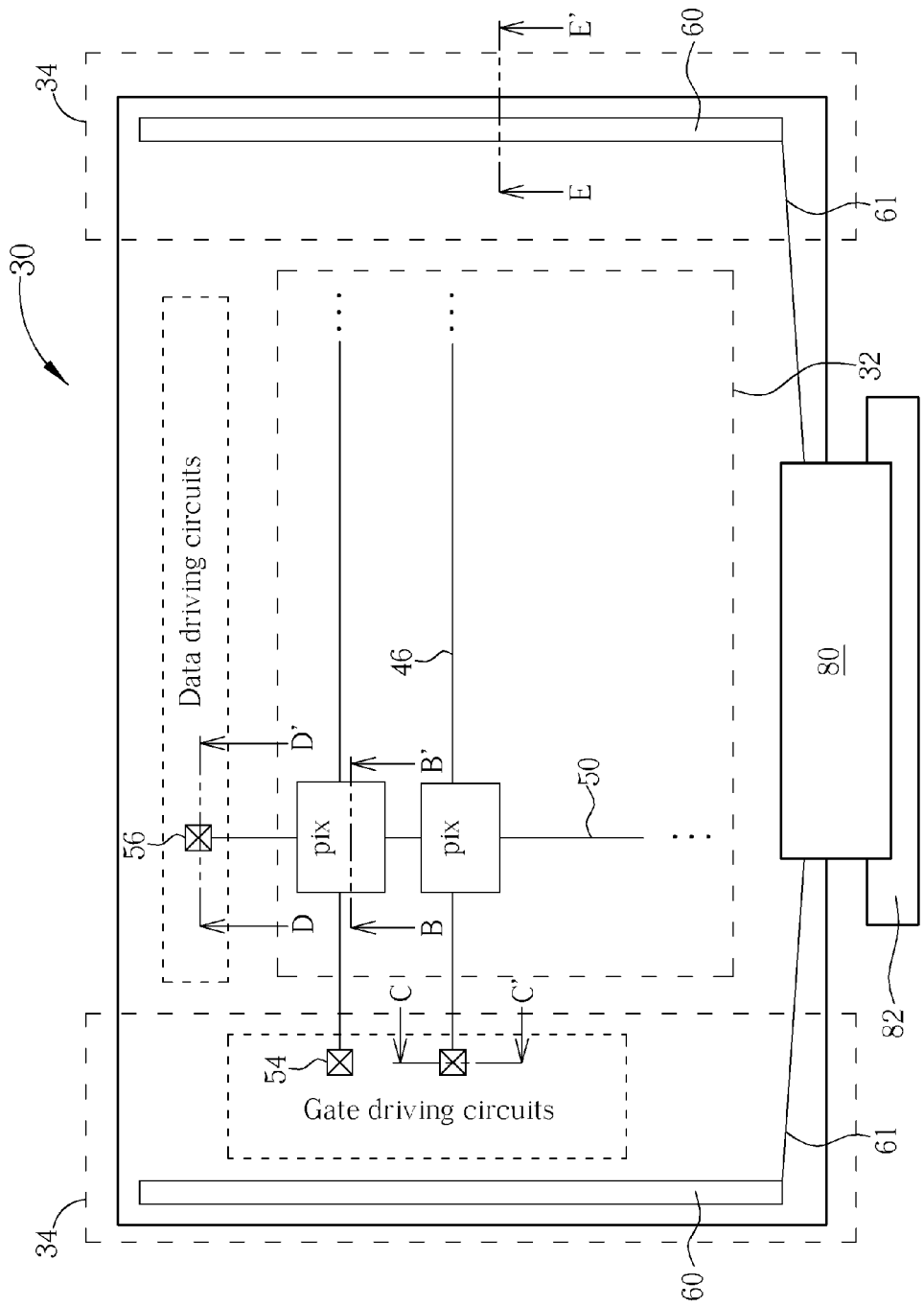
FIG. 4 to FIG. 8 are schematic diagrams illustrating a method for making an LCD according to another embodiment of the present invention.
Figure 5:
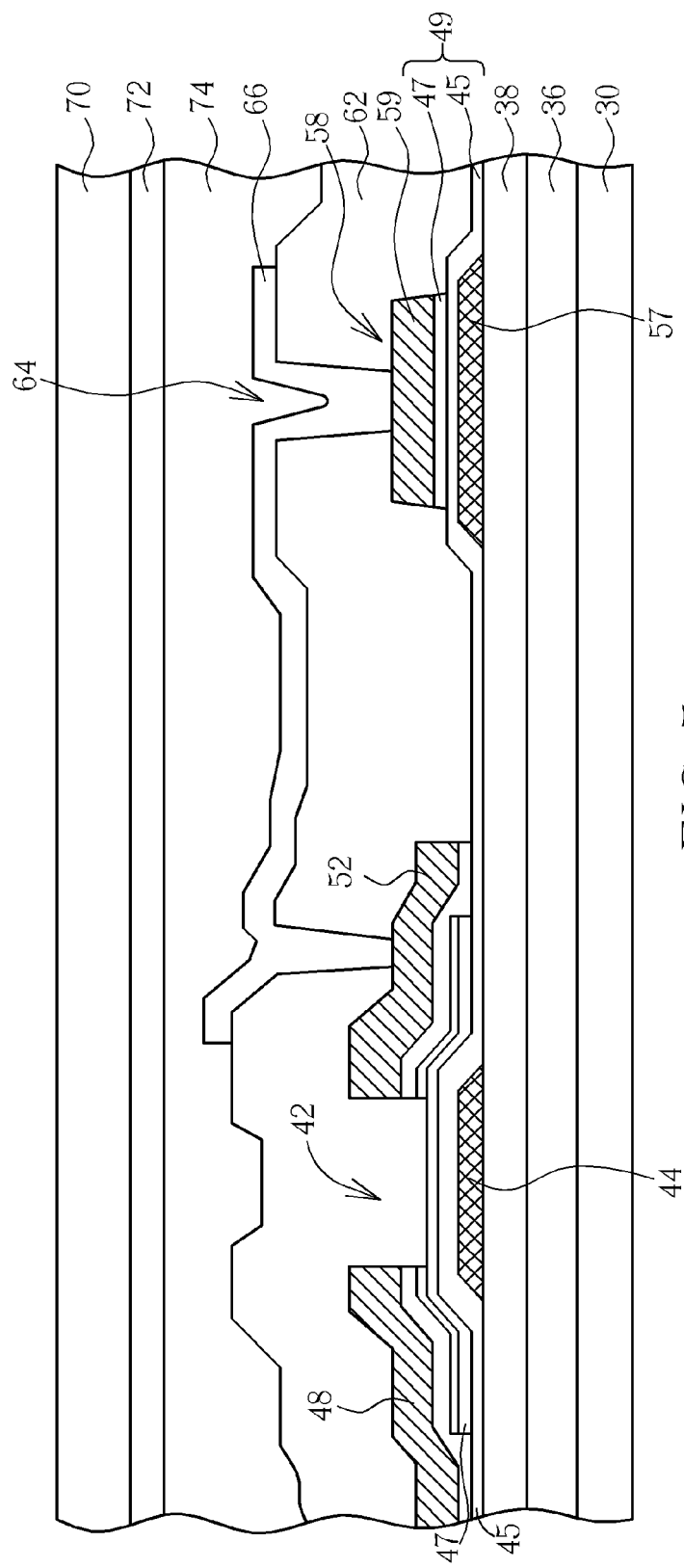
Figure 6:
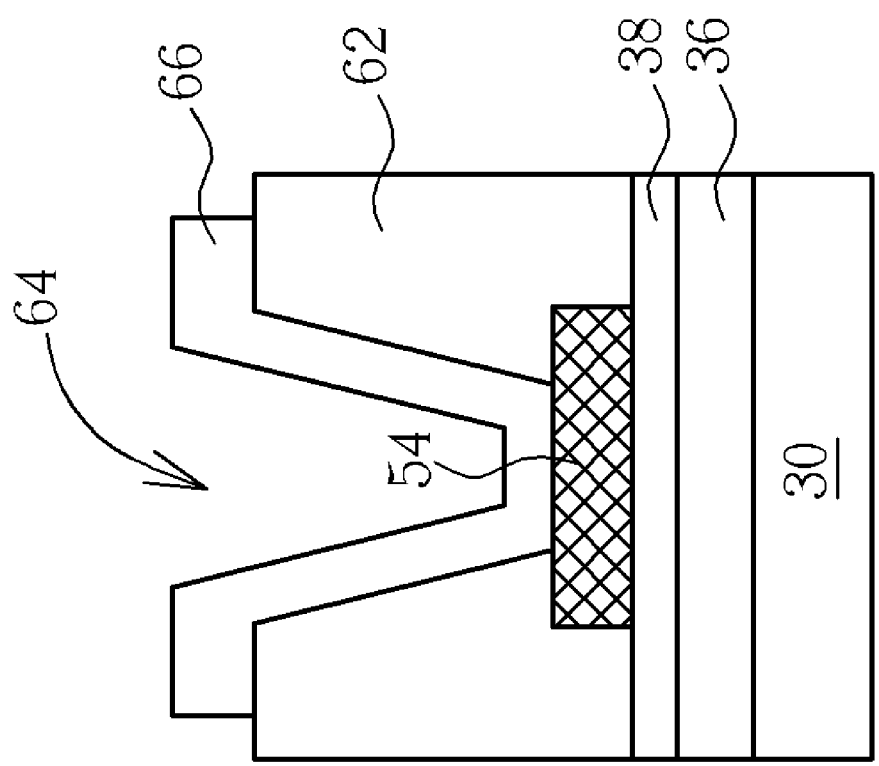
Figure 7:
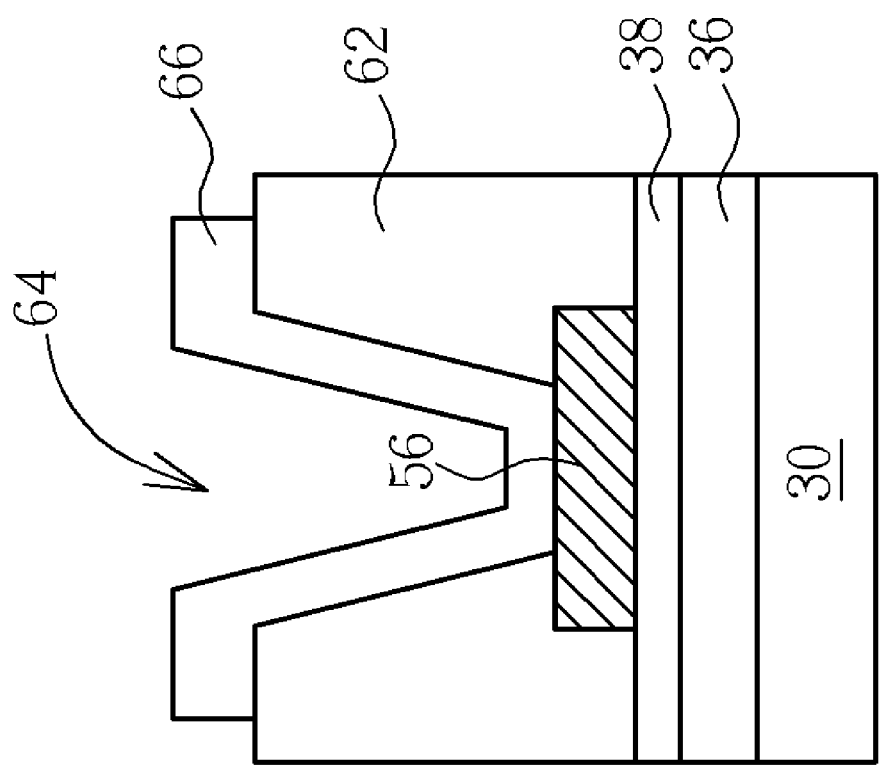
Figure 8:
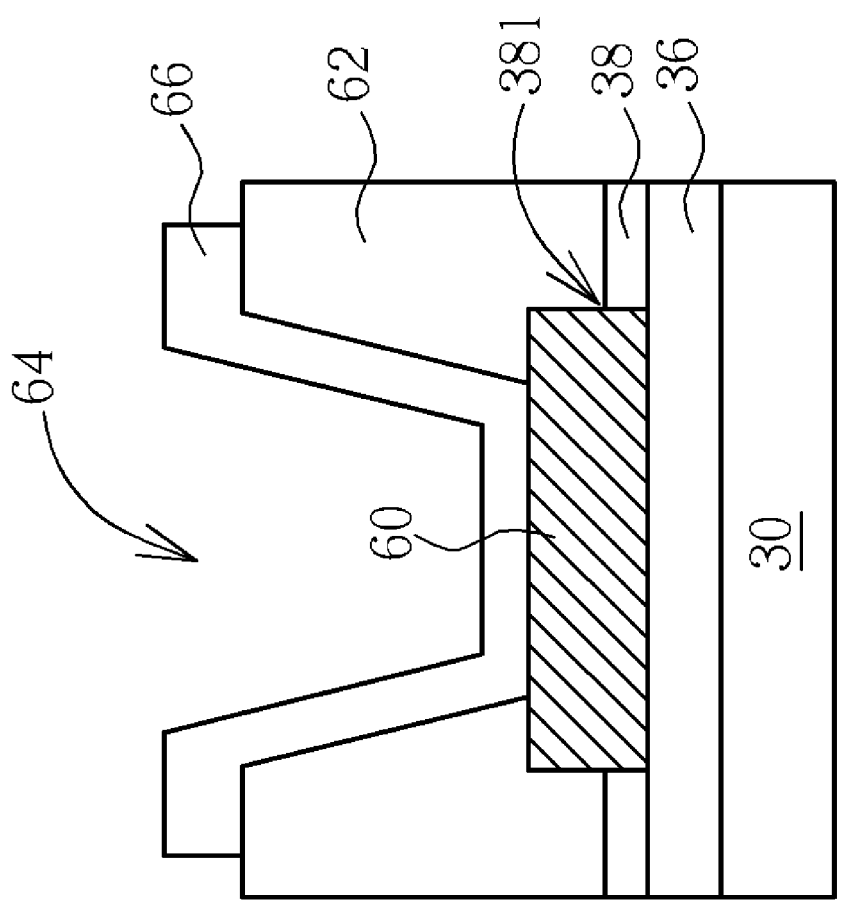

Please refer to FIG. 4 to FIG. 8 are schematic diagrams illustrating a method for making an LCD according to another embodiment of the present invention. FIG. 4 is a top view of the LCD. FIG. 5 is a cross-section of the LCD along a cross-section line BB' shown in FIG. 4 adapted to display a switching device. FIG. 6 is a cross-section of the LCD along a cross-section line CC' shown in FIG. 4 adapted to display a scan-line contact pad 54. FIG. 7 is a cross-section of the LCD along a cross-section line DD' shown in FIG. 4 adapted to display a data-line contact pad 56. FIG. 8 is a cross-section of the LCD along a cross-section line EE' shown in FIG. 4 adapted to display a bridge electrode 60. To exemplify the characteristics of this embodiment, a part of the devices, such as the second substrate and the liquid crystal layer, are not shown in FIG. 4.

As shown in FIG. 4 to FIG. 8, first, a first substrate 30 is provided. The first substrate 30 comprises a display region 32 and at least one peripheral region 34, and a plurality of pixel regions (pix) are disposed in the display region 32. Next, a heating layer 36 is formed on the first substrate 30, and an insulating layer 38 is formed on the heating layer 36. The insulating layer 38 has at least one first opening 381 (as shown in FIG. 8) exposing a portion of the heating layer 36. Sequentially, a plurality of switching devices 42, such as thin film transistor, are formed on the first substrate 30. Each switching device has a gate 44 connected to a scan line 46, a source 48 connected to a data line 50, and a drain 52. It is to be explained that the method of this embodiment further comprises the performing of the fabrication of the following devices while forming the scan line 46 and/or the data line 50.

1. A capacitor 58 is formed on the first substrate 30 while forming the scan line 46 and/or the data line 50.
2. At least one bridge electrode 60 is formed in the first opening of the insulating layer 38 while forming the scan line 46 and/or the data line 50. The bridge electrode 60 and the heating layer 36 are electrically connected to each other, but are electrically disconnected from the scan line 46 and the data line 50.
3. At least one scan-line contact pad 54 is formed on the first substrate 30 while forming the scan line 46 and/or the data line 50, and at least one data-line contact pad 56 is formed while forming the data line 50. The scan-line contact pad 54 and the data-line contact pad 56 are respectively electrically connected to the scan line 46 and the data line 50, so as to further let the scan line 46 and the data line 50 be connected to the driving circuits.
4. At least one conductive line 61 (shown in FIG. 4) is formed on the first substrate 30 while forming the scan line 46 and/or the data line 50. The conductive line 61 is composed of a conductive layer that is the same as at least one of the scan line 46 and the data line 50, and the function of the conductive line 61 is easily let the bridge electrode 60 electrically be connected to the FPC required to be formed in the following.

Figure 9:
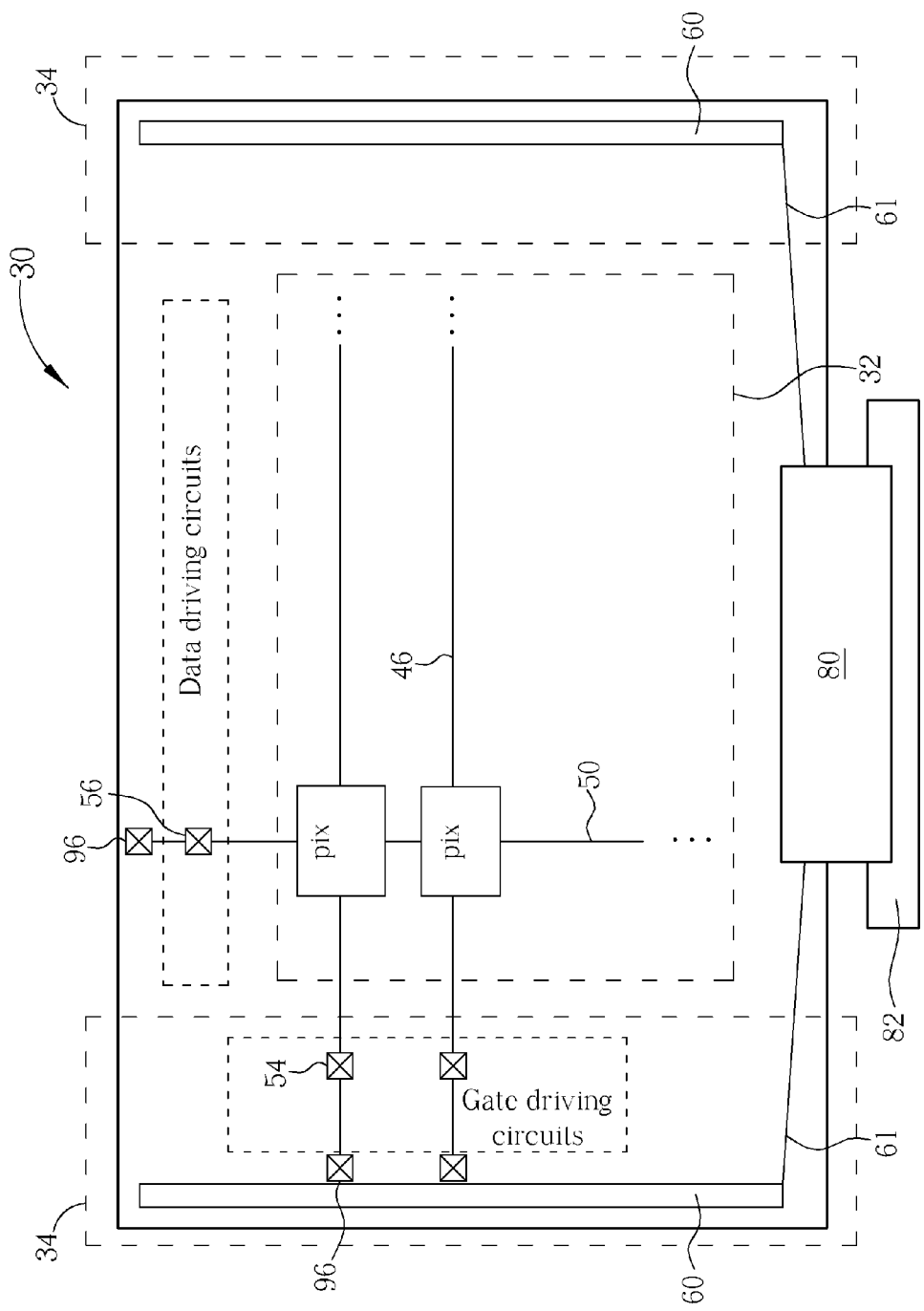
FIG. 9 is a schematic diagram illustrating a testing pad of the LCD panel according to the another embodiment of the present invention.

It is to be explained that the material of at least one of the bridge electrode 60, the scan-line contact pad 54, the data-line contact pad 56, and the conductive line 61 is substantially the same as the material of at least one of the scan line 46 and the data line 50. In addition, it is to be explained that if there are not another testing pads, the scan-line contact pad 54 and the data-line contact pad 56 of this embodiment also can be selectively regarded as the testing pad, respectively. Therefore, the testing signal can be inputted through the scan-line contact pad 54 and the data-line contact pad 56 before the driving circuits are formed. According to the differences of the designs of the LCD panel, the LCD panel of the present invention can also further be disposed of the testing pad 96 having only the testing function thereon. Please refer to FIG. 9. FIG. 9 is a schematic diagram illustrating a testing pad 96 of the LCD panel according to another embodiment of the present invention. As shown in FIG. 9, which is different from the above-mentioned embodiment, the testing pad 96 of this embodiment is disposed at a more outer position in the peripheral region 34 of the first substrate 30. And the testing pads 96 are electrically connected to the scan line 46 and the data line 50. Therefore, even if the driving circuits have been connected to the scan-line contact pad 54 and the data-line contact pad 56, the electrical testing can also be performed through the testing pad 96.

Please continue referring to FIG. 4 to FIG. 8. Sequentially, at least one passivation layer 62 is formed on the first substrate 30 to cover the switching device 42 and the capacitor 58, and the passivation layer 62 has a plurality of second openings 64 exposing the scan-line contact pad 54, the data-line contact pad 56, the capacitor 58, and the bridge electrode 60. The bridge electrode 60, the scan-line contact pad 54, and the data-line contact pad 56 are substantial electrically disconnected.

Next, at least one transparent conductive layer 66 is formed on the passivation layer 62 and the capacitor 58. The transparent conductive layer 66 is regarded as a pixel electrode in the display region 32. In this embodiment, the capacitor 58 is electrically connected to the drain 52 of the switching device 42 through the pixel electrode. But the second openings 64 can also be selectively not to be found in the passivation layer 62 at the capacitor 58. In another words, the capacitor 58 is not exposed, and is covered by the transparent conductive layer 66. On the other hand, in this embodiment, the transparent conductive layer 66 can selectively be formed on at least one of the scan-line contact pad 54, the data-line contact pad 56, and bridge electrode 60, so as to help the above-mentioned device to connect to the outside in the following steps, but is not limited to this. In addition, it is to be explained that the transparent conductive layer 66 regarded as the pixel electrode and the transparent conductive layer 66 formed on the scan-line contact pad 54, the data-line contact pad 56, and the bridge electrode 60 respectively require to connect to different signals, so they are disconnected from each other.

Further, in this embodiment, the capacitor 58 includes a lower electrode 57 made with the scan line 46 (referred to as the first metal layer in the following) at the same time, an upper electrode 59 made with the data line 50 (referred to as the second metal layer in the following) at the same time, and a capacitor dielectric layer 49 constituted by a gate insulating layer 45 and a semiconductor layer 47. The upper electrode 59 is electrically connected to the transparent conductive layer 66. However, the structure of the capacitor 58 is not limited to this, and the capacitor 58 can be of other types. For example, the capacitor dielectric layer 49 utilized in the above-mentioned capacitor can be used with only the gate insulating layer 45 or the semiconductor layer 47, or the upper electrode 59 can be isolated from the transparent conductive layer 66. The capacitor 58 also can comprise any two of the first metal layer, the second metal layer, and the transparent conductive layer 66 to be regarded as the electrodes, and at least one dielectric layer between the electrodes regarded as the capacitor dielectric layer. The capacitor 58 also can comprise a first capacitor constituted by the first metal layer, the second metal layer, and the dielectric layer therebetween, and a second capacitor constituted by the second metal layer, the transparent conductive layer 66, and the dielectric layer therebetween, such as the passivation layer 62, and the capacitor 58 also can be of other different types of capacitor structures, such as metal insulate semiconductor (MIS) type.

Furthermore, the pixel electrode of this embodiment takes the transparent conductive layer 66 to be made of such as indium-tin oxide, indium-zinc oxide, aluminum-zinc oxide, cadmium-tin oxide, hafnium oxide, or other materials, or combinations thereof, as an example, but to be not limited to this. The pixel electrode also selectively can be of opaque conductive layer, light-shielding conductive layer, or reflective conductive layer such as gold, silver, copper, iron, tin, lead, cadmium, molybdenum, wolfram, titanium, tantalum, aluminum, and other similar materials, an alloy thereof, a nitride thereof, or an oxide thereof, or a combination thereof, or a combination of the transparent conductive layer and the opaque conductive layer, the light-shielding conductive layer, and the reflective conductive layer. Besides, the pixel electrode of this embodiment takes a single layer material as an example, but the pixel electrode can also selectively be the multi-layer material, such as for example, two layers, three layers, four layers, five layers, etc., according to the design requirements. In addition, the structure of the switching device 42 of this embodiment takes a thin film transistor of a bottom-gate type, such as a back-channel etched type, etch-stopped type, or other types as an example, but is not limited to this. The structure of the switching device 42 also can selectively be the thin film transistor of a top-gate type. Furthermore, the types of the thin film transistor comprise of the N-type dopants and/or the P-type dopants thin film transistor. Furthermore, the material of the semiconductor layer of this embodiment comprises polycrystalline material including silicon, monocrystalline material including silicon, microcrystalline material including silicon, amorphous material including silicon, any of the above-mentioned crystalline material including germanium, or other materials, or a combination thereof. To reduce the resistance between the semiconductor layer and the source/drain 48, 52, it is preferred to form a doped semiconductor layer (not shown in figure) between the semiconductor and the source/drain 48, 52, or the semiconductor layer in contact with the source/drain 48, 52 is to be the doped semiconductor layer. Furthermore, the semiconductor layer of this embodiment takes undoped semiconductor layer as an example, but is not limited to this. At least one doped layer having lower concentration also can be selectively formed in the undoped semiconductor layer.

Sequentially, a second substrate 70 having a common electrode 72 is provided. The second substrate 70 is assembled to the first substrate 30. A liquid crystal layer 74 is formed between the first substrate 30 and the second substrate 70. Wherein a color filter layer (not shown in figure) is disposed on one of the first substrate 12 and the second substrate 14. In other words, the color filter layer can be selectively disposed on the second substrate 14, which is between the second substrate 14 and the common electrode, or disposed on the first substrate 12, which is one of between the first substrate 12 and the array layer (not shown in figure) and on the array layer.

Next, a first FPC 80 is disposed on the top surface of the first substrate 30. The first FPC 80 is connected to the bridge electrode 60 through the conductive line 61; and the other terminal of the first FPC 80 is connected to a PCB 82. Therefore, the voltage generated by the PCB 82 can reach the heating layer 36 through the first FPC 80, the conductive line 61, and the bridge electrode 60 in turn. When the temperature of the liquid crystal layer 74 is excessively low, the heating layer 36 can make the temperature of the liquid crystal layer 74 to rise up to the normal operating temperature range in an extremely short period of time. In addition, in this embodiment, the first FPC 80 is also in charge of transmitting the signals that the LCD requires. In this embodiment, the bridge electrode 60 is in contact with the heating layer 36, but is not limited to this, and this embodiment also can selectively utilize the pixel electrode on the heating layer 36 to connect to the heating layer 36 and the conductive line 61, without utilizing the bridge electrode 60.

Figure 10:
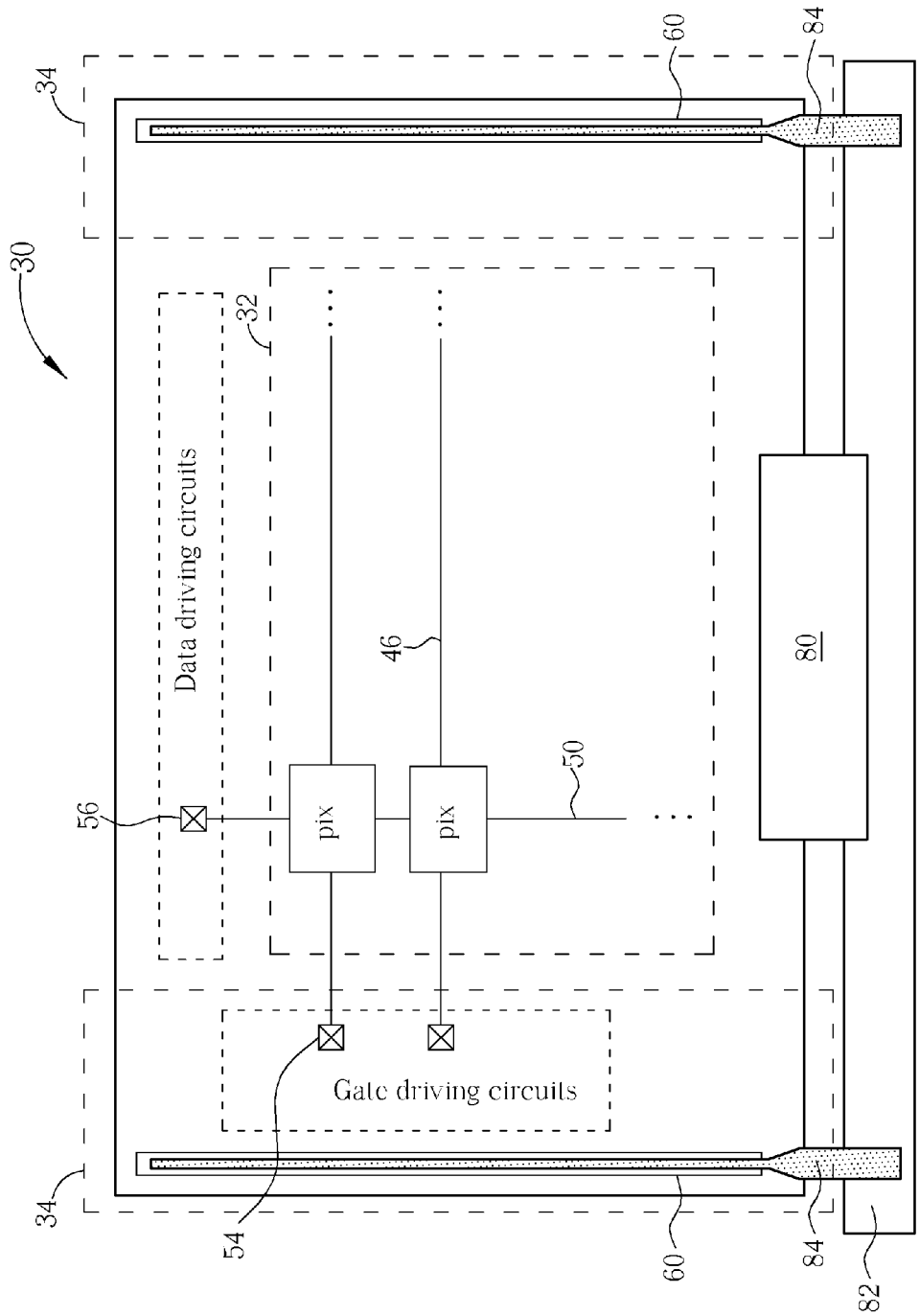
FIG. 10 to FIG. 12 are schematic diagrams illustrating a plurality of LCDs according to other embodiments of the present invention.
Figure 11:
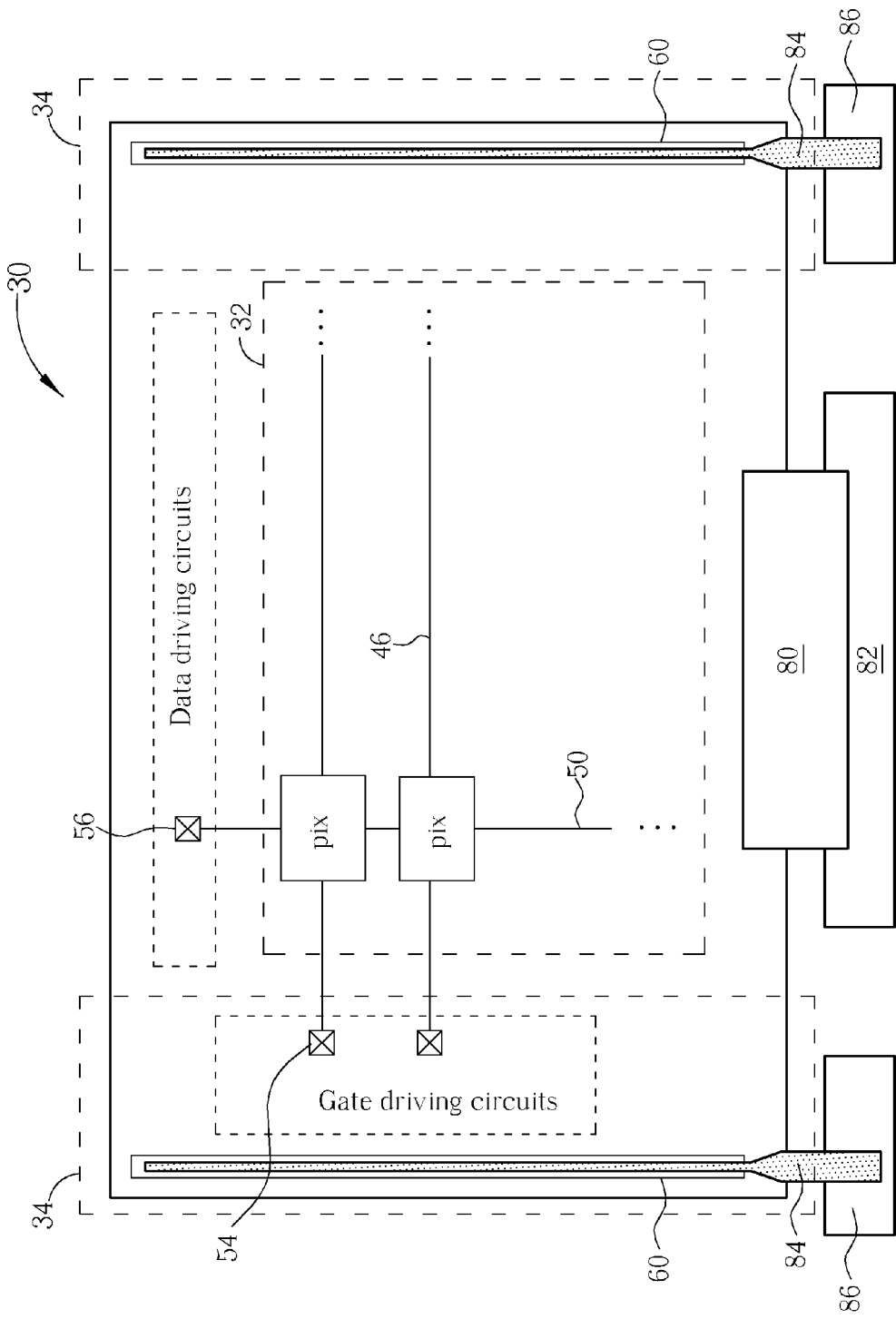
Figure 12:
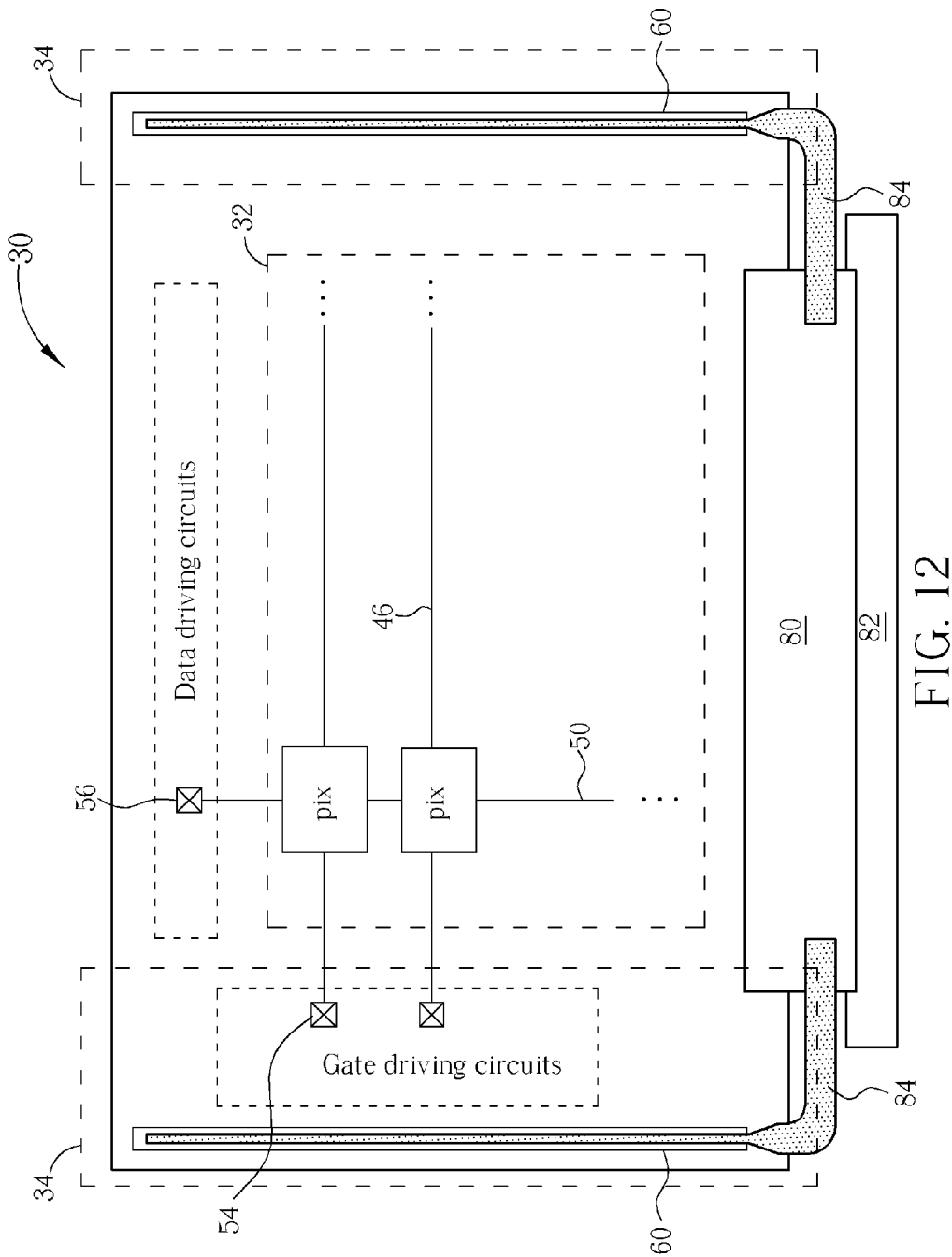

Please refer to FIG. 10 to FIG. 12, and also refer to FIG. 5 to FIG. 8 together. FIG. 10 to FIG. 12 are schematic diagrams illustrating the LCDs according to other embodiments of the present invention. In order to compare all of the embodiments, the following embodiments use the same numerals as the embodiment of FIG. 4 to FIG. 8, and redundant descriptions shall be omitted. The following are to only describe the differences between each embodiment and the others. As shown in FIG. 10, the LCD of this embodiment further comprises at least one second FPC 84 disposed on the bridge electrode 60, and the second FPC 84 and the first FPC 80 are all connected to a PCB 82. The first FPC 80 is in charge of transmitting the signal that the LCD requires, and the second FPC 84 is in charge of transmitting the voltage that the heating layer 36 requires. This embodiment takes two first FPCs 80 as an example, and this embodiment also can selectively adopt the design having both the narrow portion and the wide portion as shown in FIG. 1 to FIG. 3 as an example, but is not limited to this. According to one of the designs, at least one of the first FPCs 80 of this embodiment also can have a narrow portion and a wide portion. The narrow portion is connected to the heating layer 36, and a portion of the wide portion is protruded out of the LCD panel. The quantity of the first FPC 80 also can be in accordance with the above-mentioned embodiments.

As shown in FIG. 11, the second FPCs 84 of this embodiment are respectively connected to another PCB 86; and the first FPC 80 is connected to the PCB 82, which is different from the above-mentioned embodiment whose first FPC 80 and second FPCs 84 are all connected to the same PCB, but is not limited to this.

As shown in FIG. 12, the second FPCs 84 of this embodiment are connected to the first FPC 80 first, and then the first FPC 80 is connected to the PCB 82, but is not limited to this.

Figure 13:
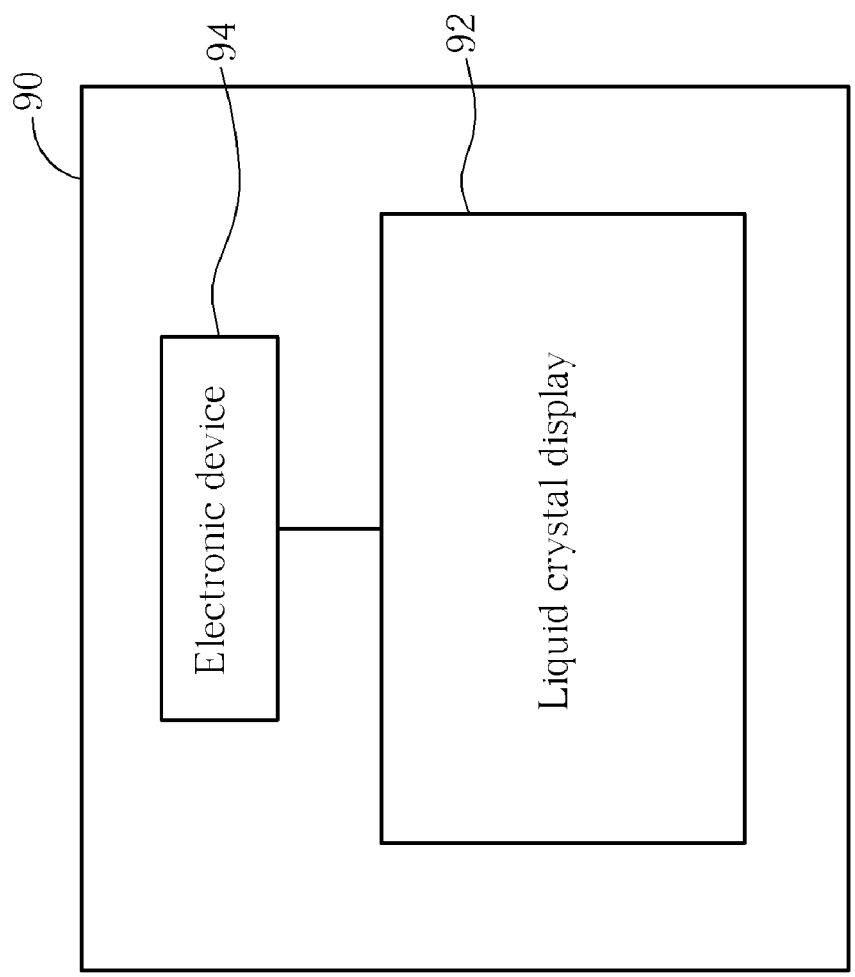
FIG. 13 is a schematic diagram illustrating an electro-optical device of the present invention.

It is to be explained that the designs of the present invention can be applied to various kinds of electro-optical devices, but the type of the embodiment is not limited to the disclosure of the above-mentioned embodiments. Please refer to FIG. 13, and FIG. 13 is a schematic diagram illustrating an electro-optical device of the present invention. As shown in FIG. 13, the LCD 92 described by the above-mentioned embodiments can be combined with an electronic device 94 to form an electro-optical device 90. The electronic device 94 comprises a control device, operating device, processing device, input device, memory device, driving device, illuminating device, protecting device, sensing device, detecting device, or other functional devices, or a combination thereof. The types of the electro-optical device 90 comprise of a portable product (such as a cell phone, a video camera, a camera, a notebook, a video player, a watch, a music player, an E-mail transceiver, a map navigator, a digital photo-frame, global positioning system (GPS) or a similar product thereto), a video product (such as a video player or a product similar thereto), a monitor, a television, a indoor/outdoor signboard, a display panel in projectors, etc.

In summary, the LCD of the present invention utilizes the design of the heating layer and the FPC are incorporated with the temperature sensor to rapidly rise up the temperature of the liquid crystal so that the LCD can be operated normally within an extremely short period of time when the operating condition of the LCD is under a reduced operating temperature environment, wherein the temperature sensor is sense/detect at least one of the environment temperature and the temperature of the liquid crystal layer, and is formed on the panel (such as display region 32, at least one peripheral region 34, or combinations thereof) and/or on the outside of the panel such as frame, printed circuit board, flexible printed circuits, other substrate, or combinations thereof), or combinations thereof. In addition, it is to be explained that the bridge electrode according to some of the embodiments of the present invention is to allow the driving circuits to transmit signals to the heating layer. Therefore, the bridge electrode is different from the structure of the contact pad and/or testing pad of the LCD panel; and the bridge electrode is electrically disconnected from both the contact pad and the testing pad.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A display device, comprising:
   a first substrate;
   a heating layer formed on the first substrate;

an insulating layer, formed on the heating layer, and comprising at least one first opening partially exposing the heating layer;

at least one switching device, formed on the first substrate, and comprising a drain, a gate connected to a scan line, and a source connected to a data line;

at least two contact pads, formed on the insulating layer, and being electrically connected to the scan line and the data line, respectively;

at least one capacitor, formed on the insulating layer;

at least one passivation layer, covering the switching device and the capacitor, and comprising a plurality of second openings exposing parts of the contact pads; and at least one pixel electrode, formed on the passivation layer, and being electrically connected to the drain of the switching device.

2. The display device of claim 1, further comprising at least one bridge electrode formed in the first opening of the insulating layer, wherein the second openings of the passivation layer expose parts of the bridge electrode, and the bridge electrode is electrically disconnected from the contact pads.

3. The display device of claim 2, further comprising at least two testing pads, formed on the insulating layer, and being electrically connected to the scan line and the data line, respectively, wherein the testing pads being electrically disconnected from the bridge electrode.

4. The display device of claim 3, wherein the material of at least one of the bridge electrode, the contact pads, and the testing pads is substantially the same as the material of at least one of the scan line and the data line.

5. The display device of claim 2, further comprising:
a first flexible printed circuit (FPC), disposed on the first substrate; and
at least one conductive line, disposed on the first substrate, and adapted to electrically connect the bridge electrode and the first FPC.

6. The display device of claim 2, further comprising:
a first FPC, disposed on the first substrate; and
at least one second FPC, disposed on the bridge electrode.

7. The display device of claim 6, wherein the second FPC is connected to the first FPC.

8. The display device of claim 5, further comprising:
a printed circuit board (PCB), connected to the first FPC.

9. The display device of claim 6, further comprising:
a PCB, connected to the first FPC and the second FPC.

10. The display device of claim 7, further comprising:
a PCB connected to the second FPC.

11. An electro-optical device comprising the display device of claim 1.

12. A method for making a display device, comprising:
providing a first substrate;
forming a heating layer on the first substrate;
forming an insulating layer on the heating layer, and the insulating layer comprising at least one first opening partially exposing the heating layer;
forming at least one switching device on the first substrate, and the switching device comprising a drain, a gate connected to a scan line, and a source connected to a data line;
forming at least two contact pads electrically connected to the scan line and the data line on the insulating layer, respectively;
forming at least one capacitor on the insulating layer;
covering at least one passivation layer on the switching device and the capacitor, and the passivation layer comprising a plurality of second openings exposing parts of the contact pads; and
forming at least one pixel electrode on the passivation layer, and the pixel electrode being electrically connected to the drain of the switching device.

13. The method of claim 11, further comprising forming at least one bridge electrode in the first opening, wherein the second openings expose parts of the bridge electrode, and the bridge electrode is electrically disconnected from the contact pads.

14. The method of claim 13, further comprising forming at least two testing pads on the insulating layer, and electrically connecting to the scan line and the data line, respectively, wherein the testing pads being electrically disconnected from the bridge electrode.

15. The method of claim 14, wherein the material of at least one of the bridge electrode, the contact pads, and the testing pads being substantially the same as the material of at least one of the scan line and the data line.

16. The method of claim 13, further comprising:
disposing a first flexible printed circuit (FPC) on the first substrate; and
disposing at least one conductive line on the first substrate so as to electrically connect the bridge electrode and the first FPC.

17. The method of claim 13, further comprising:
disposing a first FPC on the first substrate; and
disposing at least one second FPC on the bridge electrode.

18. The method of claim 17, wherein the second FPC is connected to the first FPC.

19. The method of claim 16, further comprising:
providing a printed circuit board (PCB) connected to the first FPC.

20. The method of claim 17, further comprising:
providing a PCB connected to the first FPC and the second FPC.

21. The method of claim 18, further comprising:
providing a PCB connected to the second FPC.

* * * * *